United States Patent
Nishimura et al.

(12) 
(10) Patent No.: US 6,426,384 B1
(45) Date of Patent: Jul. 30, 2002

(54) POLYETHYLENE FILM FOR PACKAGING

(75) Inventors: Toshihiro Nishimura; Hiroshi Inoue; Michio Takeuchi, all of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/744,076

(22) PCT Filed: May 20, 1999

(86) PCT No.: PCT/JP99/02659

§ 371 (c)(1),
(2), (4) Date: Jan. 19, 2001

(51) Int. Cl.[7] .......................... C08L 23/00; C08L 23/04

(52) U.S. Cl. ........................................ 525/191; 525/240

(58) Field of Search ................................. 525/240, 191

(56) References Cited

FOREIGN PATENT DOCUMENTS

| JP | 971666 | 3/1997 |
|---|---|---|
| JP | 995571 | 4/1997 |
| JP | 995572 | 4/1997 |
| JP | 927895 3 | 10/1997 |

*Primary Examiner*—Nathan M. Nutter
(74) *Attorney, Agent, or Firm*—Birch, Stewart, Kolasch & Birch, LLP

(57) ABSTRACT

The polyethylene film of the present invention is excellent in tear resistance, impact resistance and transparency. The film of the invention is a polyethylene film suitable for packaging formed from a resin composition comprising a low-density polyethylene (A) having specific ranges of the density, melt flow rate and molecular weight distribution(Mw/Mn), and having (i) a thickness of 10 to 30 $\mu$m, (ii) Elmendorf tear strength of at least 20 kg/cm in the longitudinal direction, (iii) dart impact strength of at least 50 g, and (iv) HAZE value of not greater than 8%.

4 Claims, No Drawings

POLYETHYLENE FILM FOR PACKAGING

This application is the national phase under 35 U.S.C. §371 of PCT International Application No. PCT/JP99/02659 which has an International filing date of May 20, 1999, which designated the United States of America.

TECHNICAL FIELD

The present invention relates to a polyethylene film for packaging. More particularly, the present invention relates to a polyethylene film for packaging which possesses excellent tear resistance, impact resistance and transparency and suitable for use mainly in wrapping a boxed tissue pile, a cleaning bag, etc.

TECHNICAL BACKGROUND

Polyethylene has a wide variety of applications as a film material because of its excellent waterproof, chemical resistance, transparency and hygienic properties. Therefore, polyethylene has been widely used as a packaging material.

A polyethylene film made from, e.g., a composition of a high-density polyethylene and a low-density polyethylene prepared by high-pressure polymerization process has been hitherto used as a packaging material for wrapping a boxed tissue pile, a cleaning bag, etc., utilizing its transparency. On the other hand, however, it is pointed out that strength of the polyethylene film is yet insufficient and film moldability is poor since surface roughening occurs unless a molding temperature is elevated. Furthermore, the polyethylene film tears in the longitudinal direction (machine direction: MD) of a film or occasionally generates holes depending upon application. Therefore, it has been desired to improve tear resistance in the longitudinal direction and impact resistance.

An object of the present invention is to provide a polyethylene film for packaging which is excellent not only in transparency but also in moldability, a smooth surface and tear resistance in the longitudinal direction (MD) and impact resistance, as compared to a conventional polyethylene film formed from a composition of a high-density polyethylene and a low-density polyethylene prepared by high-pressure polymerization process.

DISCLOSURE OF THE INVENTION

The polyethylene film for packaging in accordance with the present invention is prepared from a polyethylene resin composition comprising (A) a low-density polyethylene prepared using a metallocene-based catalyst and (B) a high-density polyethylene.

More specifically, the polyethylene film for packaging of the present invention is formed from a polyethylene resin composition comprising (A) a low-density polyethylene prepared using a metallocene-based catalyst and (B) a high-density polyethylene, in a weight ratio of 30/70 to 70/30 [(A)/(B)], characterized in that the low-density polyethylene (A) has the following properties:

(i) the density is in the range of 0.900 to 0.920 g/cm$^3$;

(ii) the melt flow rate is in the range of 0.05 to 1.0 g/10 mins.; and, (iii) the molecular weight distribution (Mw/Mn) is in the range of 1.5 to 3.5;

the high-density polyethylene has the following properties:

(i) the density is in the range of 0.954 to 0.970 g/cm$^3$; and, (ii) the melt flow rate is in the range of 0.1 to 10.0 g/10 mins.; and, the polyethylene film has the following properties:

(i) the thickness is in the range of 10 to 30 μm;

(ii) the Elmendorf tear strength is at least 20 kg/cm in the longitudinal direction;

(iii) the dart impact strength is at least 50 g; and, (iv) the HAZE value is not greater than 8%.

Low-Density Polyethylene (A)

The low-density polyethylene (A) used in the present invention is an ethylene/α-olefin copolymer comprising ethylene and an α-olefin, preferably an α-olefin having 3 to 12 carbon atoms, which is prepared using a metallocene-based catalyst.

As the α-olefin an α-olefin having 3 to 12 carbon atoms is preferred. Specific examples of preferred α-olefins include propylene, 1-butene, 1-pentene, 1-hexene, 4-methyl-1-pentene, 1-heptene, 1-octene, 1-nonene, 1-decene, 1-undecene, 1-dodecene, etc. When the α-olefin is used as a comonomer, one or more kinds may also be used.

Typical examples of the low-density polyethylene (A) which can be preferably employed in the present invention are ethylene/1-butene copolymer, ethylene/1-pentene copolymer, ethylene/1-hexene copolymer, ethylene/4-methyl-1-pentene copolymer and ethylene/1-octene copolymer.

The low-density polyethylene (A) used in the present invention has an ethylene content of generally 95 to 99 mol %, preferably 96 to 98 mol %, in which the α-olefin content as the comonomer is generally from 1 to 5 mol %, preferably 2 to 4 mol %.

The low-density polyethylene (A) used in the present invention has the density ranging from 0.900 to 0.920 g/cm$^3$, preferably 0.905 to 0.915 g/cm$^3$.

The low-density polyethylene (A) has the melt flow rate in the range of 0.05 to 1.0 g/10 mins., preferably 0.1 to 0.8 g/10 mins.

The molecular weight distribution of the low-density polyethylene (A) used in the present invention is in the range of 1.5 to 3.5, preferably 2.0 to 2.5, indicating the low-density polyethylene has a narrow molecular weight distribution. The molecular weight distribution referred to in the invention is distribution of a molecular weight (Mw/Mn, Mw: weight-average molecular weight, Mn: number-average molecular weight) measured by GPC, which will be later described.

The linear polyethylene (A) of the present invention preferably has the property that the melt tension (MT (g)) at 190° C. and the melt flow rate (MFR (g/10 mins.)) satisfy the following relation.

$$MT > 2.2 \times MFR^{-0.84} \quad \text{(i)}$$

The linear polyethylene (A) of the present invention preferably has the property that the content (W (% by weight)) of a decane-soluble component at room temperature and the density (d (g/cm$^3$)) satisfy the following relation.

$$W < 80 \times \exp(-100(d - 0.88)) + 0.1 \quad \text{(ii)}$$

The linear polyethylene (A) of the present invention preferably has the property that the temperature (Tm (° C.))

at which the endothermic curve measured by a differential scanning calorimeter (DSC) shows the maximum peak and the density (d) satisfy the following relation.

$$Tm < 400 \times d - 248 \quad \text{(ii)}$$

More preferably, the linear polyethylene (A) of the present invention satisfies the relations (i), (ii) and (iii) at the same time.

Most preferably, the linear polyethylene (A) of the present invention further satisfies the following relation between the flow index (FI (1/sec)) defined by a shear rate which is given when a shear stress of molten polymer at 190° C. reaches $2.4 \times 10^6$ dyne/cm$^2$ and the melt flow rate (MFR (g/10 mins)).

$$FI > 75 \times MFR \quad \text{(iv)}$$

The low-density polyethylene (A) employed in the invention can be prepared by copolymerizing ethylene and an α-olefin, preferably an α-olefin having 3 to 12 carbon atoms, in the presence of a so-called metallocene-based catalyst for olefin polymerization, including metallocene catalyst components (a) described in, for example, Japanese Laid-Open Patent Application No. HEI 6-9724, 6-136195, 6-136196 and 6-207057.

Such a metallocene-based catalyst conventionally comprises (a) a metallocene catalyst component comprising a compound of a transition metal of Group IVB in the periodic table containing at least one ligand having cyclopentadienyl skeleton and (b) an organoaluminum oxy-compound catalyst component, and if necessary and desired, further comprises (c) a particulate carrier, (d) an organoaluminum compound catalyst component, or (e) an ionizing ionic compound catalyst component.

The metallocene catalyst component (a) which is preferably employed in the present invention is, for example, a compound of the transition metal of Group IVB in the periodic table containing at least one ligand having cyclopentadienyl skeleton. Such a transition metal compound includes a compound represented, for example, by general formula [I] below:

$$ML^1x \quad \text{[I]}$$

wherein:

x is a valence of transition metal atom M;

M is a transition metal atom selected from the Group IVB in the periodic table, among which metals zirconium is preferred; and, L$^1$ is ligands that coordinate with the transition metal atom M, in which at least one is a ligand containing cyclopentadienyl skeleton and the cyclopentadienyl may optionally be substituted.

Where the compound represented by general formula [I] above contains two or more groups having the cyclopentadienyl skeleton, the two of cyclopentadienyl-containing groups may be bonded to one another via a (substituted) alkylene or a (substituted) silylene group. These two cyclopentadienyl skeletons may optionally be substituted with two or more substituents such as methyl or ethyl.

Ligands L$^1$ other than the ligand having the cyclopentadienyl skeleton are an alkyl group, a cycloalkyl group, an aryl group, an aralkyl group, an alkoxy group, an aryloxy group, a trialkylsilyl group, a sulfonato-containing hydrocarbon group, a halogen atom or hydrogen atom.

As the organoaluminum-oxy compound catalyst component(b)), conventionally known alumino-oxane compounds are preferably used.

As the particulate carrier (c), a known inorganic or organic compound in a granular or fine particulate solid form, preferably having a particle diameter of 20 to 200 μm, is preferably used.

As the organic aluminum compound catalyst component (d), there are employed a trialkylaluminum, an alkenylaluminum, a dialkylaluminum halide and an alkylaluminum sesquihalide, etc.

Also available as the ionizing ionic compounds are a Lewis acid; an ionic compound such as triphenylcarbenium tetrakis(pentafluorophenyl) borate, etc.; a carborane such as dodecaborane.

The low-density polyethylene (A) used in the invention can be prepared by copolymerizing ethylene and an α-olefin in a gaseous phase or a liquid phase of slurry or solution under various conditions in the presence of a catalyst containing the metallocene-based catalyst component (a) described above.

In slurry or solution polymerization, an inert hydrocarbon may be used as a solvent or, the olefin itself may also be used as a solvent.

In the present invention, the low-density polyethylene (A) described above can be prepared, if necessary and desired, by means of (1) multi-stage polymerization, (2) multi-stage polymerization in liquid and gaseous phases, or (3) preliminary polymerization in a liquid phase followed by polymerization in a gaseous phase.

The low-density polyethylene (A) obtained by these methods has a narrow molecular weight distribution and almost linear molecular configuration. Because of the minimized amount of low molecular weight components contained, exudation onto the surface of a film is hardly observed so that the low-density polyethylene is suitable especially for use in food wrapping or the like.

The low-density polyethylene (A) is employed in the composition in 30 to 70 parts by weight, preferably 35 to 65 parts by weight, based on 100 parts by weight in total of the low-density polyethylene (A) and the high-density polyethylene (B).

High-Density Polyethylene (B)

The high-density polyethylene (B) used in the invention has the density of 0.954 to 0.970 g/cm$^3$, preferably, 0.960 to 0.965 g/cm$^3$.

The high-density polyethylene (B) has the melt flow rate of 0.1 to 10.0 g/10 mins., preferably 0.5 to 5 g/10 mins.

When the melt flow rate of the high-density polyethylene is within the range defined above, the polyethylene resin composition having excellent film moldablity can be obtained.

The high-density polyethylene (B) used in the present invention is a high-density polyethylene having the density and melt flow rate defined above. The high-density polyethylene (B) may be a homopolymer of ethylene or an ethylene/α-olefin copolymer obtained by copolymerizing ethylene with a small quantity of an α-olefin, for example, not greater than 10 mol % of an α-olefin having 3 to 8 carbon atoms such as propylene, 1-butene, 1-pentene, 3-methyl-1-butene, 1-hexene, 3-methyl-1-pentene, 4-methyl-1-pentene, etc.

According to the present invention, it is preferred to use 70 to 30 parts by weight, preferably 65 to 35 parts by weight of the high-density polyethylene (B) based on 100 parts by weight in total of the low-density polyethylene (A) and the high-density polyethylene (B).

Polyethylene Film for Packaging

The polyethylene film in accordance with the invention is formed from the polyethylene resin composition comprising the low-density polyethylene (A) and the high-density polyethylene (B) described above.

In the polyethylene resin composition, various known additives conventional in the art can also be incorporated, if desired, as needed to extent not impairing the objects of the invention. Examples of these additives include antioxidants, UV absorbers, lubricants, slip agents, anti-blocking agents, sagging agents, antistatic agents, coloring agents, carbon black, high-pressure low-density polyethylene, medium-density polyethylene, ethylene/vinyl acetate copolymers, ethylene/α-olefin copolymer rubbers, etc.

The polyethylene film for packaging of the present invention desirably has a thickness of 10 to 30 $\mu$m, preferably 15 to 25 $\mu$m.

The polyethylene film for packaging of the present invention has the following physical properties.

(1) The Elmendorf tear strength is at least 20 kg/cm, preferably 25 kg/cm or higher, in the longitudinal direction.

(2) The dart impact strength is at least 50 g, preferably 80 g or more.

(3) The HAZE value is not greater than 8%, preferably 6% or less.

Preparation of Polyethylene Film

The polyethylene film for packaging of the present invention can be readily formed from the polyethylene resin composition described above by film molding such as inflation. Thus, a film having excellent surface conditions can be obtained.

Film molding by inflation can be carried out by extruding the polyethylene resin composition through a slit die and allowing to inflate with a predetermined airflow. Upon extruding the polyethylene resin composition, it is advantageous to set a resin temperature between 190 and 250° C.

The test methods used in the present invention are as follows.
(1) Elmendorf Tear Strength
The Elmendorf tear strength was measured by the tear strength test in accordance with JIS P 8116.
(2) Dart Impact Strength
The dart impact strength was measured by the impact test in accordance with JIS Z 1707 (dart tip diameter, 38 mm).
(3) HAZE Value
The HAZE value was measured in accordance with JIS K 6714.
(4) Molecular Weight Distribution (Mw/Mn)
The molecular weight distribution (Mw/Mn) was measured in the following manner using a measuring device of GPC-150C made by Millipore Co.

The measurement was carried out using a column of TSK GNH HT having a diameter of 72 mm and a length of 600 mm at a column temperature of 140° C. In this measurement, o-dichlorobenzene (available from Wako Pure Chemical Industries Ltd.) was used as a mobile phase which contained 0.025% by weight of BHT (available from Takeda Chemical Industries, Ltd.) as an antioxidant. A moving rate of the mobile phase was 1.0 ml/min. 500 microliters of a sample having a concentration of 0.1% by weight was introduced into the column. A differential refractometer was used as a detector. With respect to the standard polystyrene of Mw<1,000 and Mw>4×10$^6$, those available from Tosoh Corporation were used, and with respect to the standard polystyrene of 1,000 <Mw<4×10$^6$, those available from Pressure Chemical Co. were used.

(5) Melt Flow Rate (MFR)
MFR was measured at 190° C. under a load of 2.16 kg in accordance with ASTM D-1238.
(6) Density
The density was measured at a temperature of 23±0.1° C. in accordance with condition D of JIS K 7112.
(7) Composition of Low-Density Polyethylene (A)
The composition of the low-density polyethylene (A) is generally determined by $^{13}$C-NMR spectrum analysis of a sample prepared by homogeneously dissolving about 200 mg of the ethylene/α-olefin copolymer in 1 ml of hexachlorobutadiene in a sample tube having a diameter of 10 mm. The spectrum is obtained under the conditions of a measuring temperature of 120° C., a measuring frequency of 25.05 MHz, a spectrum width of 1,500 Hz, a pulse repetition period of 4.2 sec and a pulse width of 6 $\mu$sec.
(8) Melt Tension (MT)
The melt tension is determined by measuring a stress given when a molten polyethylene is stretched at a constant rate. That is, granulated pellets of polyethylene were used as a sample for the measurement. The measurement was carried out under the conditions of a resin temperature of 190° C., an extrusion rate of 15 mm/min, a take-up rate of 10 to 20 m/min, a nozzle diameter of 2.09 mm ø and a nozzle length of 8 mm using a MT measuring apparatus (manufactured by Toyo Seiki Seisakusho K.K.).

EXAMPLES

Hereinafter the present invention will be described with reference to the following Examples but is not deemed to be limited thereto.

The components used in Examples and Comparative Examples are as follows.

Low-density polyethylene (L-LDPE):
catalyst used for preparation: metallocene-based catalyst
1-hexene content: 9.8 wt %
density: 0.915 g/cm$^3$
MFR: 0.50 g/10 mins.
molecular weight distribution (Mw/Mn): 2.0
The properties of L-LDPE are summarized in Table 1 below.

TABLE 1

| Comonomer | | MFR | | | W of n-decane soluble | |
|---|---|---|---|---|---|---|
| Kind | Content (wt %) | (g/10 mins) | Mw/Mn | Density (g/cm$^3$) | component (wt %) | Value of *1 |
| 1-hexene | 9.8 | 0.5 | 2.0 | 0.915 | 2.3 | 2.5 |
| Tm (° C.) | MT (g) | Value of *2 | | Value of *3 | FI (S$^{-1}$) | Value of *4 |
| 113 | 4.4 | 3.9 | | 118 | 44 | 37.5 |

*1 W < 80 × exp (−100 (d − 0.88)) + 0.1
*2 2.2 × MFR$^{-0.84}$
*3 400 × d-248
*4 75 × MFR High-density Polyethylene (HDPE):
(1) high-density polyethylene prepared using a Ziegler type catalyst [HDPE-1]:
density: 0.968 g/cm$^3$
MFR: 5.2 g/10 mins
molecular weight distribution (Mw/Mn): 3.8

(2) high-density polyethylene prepared using a Ziegler type catalyst [HDPE-2]:
density: 0.954 g/cm³
MFR: 1.1 g/10 mins
molecular weight distribution (Mw/Mn): 3.6
(3) high-density polyethylene prepared using a Ziegler type catalyst [HDPE-3]:
density: 0.957 g/cm³
MFR: 0.35 g/10 mins
molecular weight distribution (Mw/Mn): 6.2

Molding Conditions
molding machine: Placo LM, inflation molding machine with 65 mm ø (manufactured by Placo Co., Ltd.)
die diameter: 100 mm ø
molding temperature: 200° C. at cylinder, 210° C. at die
take-off rate: 40 m/min With respect to the film prepared as described above, the Elmendorf tear strength, dart impact strength and HAZE value were measured by the methods described above.

The results are shown in Table 2.

TABLE 2

|  | Ex. 1 | Ex. 2 | Ex. 3 | Comp. Ex. 1 | Ex. 4 | Comp. Ex. 2 | Comp. Ex. 3 | Comp. Ex. 4 |
|---|---|---|---|---|---|---|---|---|
| Resin Composition [part by weight] | | | | | | | | |
| Low-density polyethylene | | | | | | | | |
| L-LDPE | 40 | 50 | 60 | 30 | 40 | 30 | 40 | — |
| High-density polyethylene | | | | | | | | |
| HDPE-1 | 60 | 50 | 40 | — | — | — | — | — |
| HDPE-2 | — | — | — | 70 | 60 | — | — | — |
| HDPE-3 | — | — | — | — | — | 70 | 60 | — |
| HDPE-4 | — | — | — | — | — | — | — | 70 |
| Low-density polyethylene | | | | | | | | |
| LDPE | — | — | — | — | — | — | — | 30 |
| Polyethylene resin composition (pellet) | | | | | | | | |
| density [g/cm³] | 0.946 | 0.941 | 0.935 | 0.942 | 0.938 | 0.944 | 0.940 | 0.947 |
| melt flow rate [g/10 min] | 2.1 | 1.6 | 1.1 | 0.87 | 0.80 | 0.63 | 0.60 | 0.50 |
| Thickness of polyethylene film [μm] | 20 | 20 | 20 | 20 | 20 | 20 | 20 | 20 |
| Physical properties of film | | | | | | | | |
| Elmendorf tear strength [kg/cm] | | | | | | | | |
| MD | 23 | 34 | 56 | 17 | 26 | 10 | 17 | 5 |
| TD | 290 | 285 | 257 | 300 | 316 | 368 | 510 | 256 |
| Dart impact strength [g] | 88 | 116 | 162 | 36 | 80 | 25 | 34 | 20 |
| HAZE [%] | 5.3 | 4.2 | 3.4 | 6.0 | 5.4 | 30.0 | 17.0 | 6.5 |

(4) high-density polyethylene prepared using a Ziegler type catalyst [HDPE-4]:
density: 0.955 g/cm³
MFR: 0.60 g/10 mins
molecular weight distribution Mw/Mn: 3.0
Low-density Polyethylene (LDPE):
prepared by high-pressure polymerization
density: 0.922 g/cm³
MFR: 0.50 g/10 mins Examples 1–4 and Comparative Examples 1–4

The components shown in Table 2 were mixed in proportions given in Table 2, respectively, using a Henschel mixer. The resulting mixture was pelletized by an extruder to give the corresponding polyethylene resin composition.

The properties of the thus obtained polyethylene resin composition are shown in Table 2.

The polyethylene resin composition obtained was molded into a film by air-cooled inflation technique under the following molding conditions. Thus, a film having a smooth surface, a thickness of 20 μm and a width of 900 mm could be readily prepared.

INDUSTRIES APPLICABILITY

The polyethylene film for packaging of the present invention not only has an excellent transparency but has strong mechanical properties, especially excellent tear resistance in the longitudinal direction (MD) and impact resistance, as compared to conventional polyethylene films for packaging formed from a composition comprising a known high-density polyethylene and a low-density polyethylene prepared by high-pressure polymerization.

Therefore, the polyethylene film for packaging of the present invention is suitable for a wide variety of applications, particularly for use in wrapping a boxed tissue pile, a cleaning bag, vegetable packaging, etc.

What is claimed is:
1. A polyethylene film for packaging formed from a polyethylene resin composition comprising a low-density polyethylene (A) prepared using a metallocene-based catalyst and a high-density polyethylene (B) in a weight ratio of 30/70 to 70/30 [(A)/(B)], wherein:
said low-density polyethylene (A) has the properties that:
(i) the density is in the range of 0.900 to 0.920 g/cm³;
(ii) the melt flow rate is in the range of 0.05 to 1.0 g/10 mins.; and,
(iii) the molecular weight distribution (Mw/Mn) is in the range of 1.5 to 3.5;

said high-density polyethylene (B) has the properties that:
(i) the density is in the range of 0.954 to 0.970 g/cm$^3$; and,
(ii) the melt flow rate is in the range of 0.1 to 10.0 g/10 mins.; and, said film has the properties that:
(i) the thickness is in the range of 10 to 30 μm;
(ii) the Elmendorf tear strength is at least 20 kg/cm in the longitudinal direction;
(iii) the dart impact strength is at least 50 g; and,
(iv) the HAZE value is not greater than 8%.

2. The polyethylene film for packaging according to claim 1, wherein said low-density polyethylene (A) has the properties (1), (2) and (3) that:

(1) the melt tension (MT (g)) at 190° C. and the melt flow rate (MFR (g/10 mins.)) satisfy the following relation:

$MT>2.2\times MFR^{-0.84}$ (2) the content (W (% by weight)) of a decane-soluble component at room temperature and the density (d (g/cm$^3$)) satisfy the following relation;

$W<80\times \exp(-100(d-0.88))+0.1$ and, (3) the temperature (Tm (° C.)) at which the endothermic curve measured by a differential scanning calorimeter (DSC) shows the maximum peak and the density (d) satisfy the following relation:

$Tm<400\times d-248.$

3. The polyethylene film for packaging according to claim 2, wherein said low-density polyethylene (A) further satisfies the following relation between the flow index (FI (1/sec)) defined by a shear rate which is given when a shear stress of molten polymer at 190° C. reaches 2.4×10$^6$ dyne/cm$^2$ and the melt flow rate (MFR (g/10 mins)):

$FI>75\times MFR.$

4. The polyethylene film for packaging according to any one of claims 1 to 3, wherein said weight ratio [(A)/(B)] of the low-density polyethylene (A) to the high-density polyethylene (B) is 35/65 to 65/35.

* * * * *